Jan. 27, 1959 W. J. SCHMIDT 2,871,421
ELECTRICAL MEASURING DEVICE
Filed June 23, 1955 2 Sheets-Sheet 1

INVENTOR
Warren J. Schmidt
BY
ATTORNEY

Jan. 27, 1959 W. J. SCHMIDT 2,871,421
ELECTRICAL MEASURING DEVICE
Filed June 23, 1955 2 Sheets-Sheet 2

United States Patent Office 2,871,421
Patented Jan. 27, 1959

2,871,421
ELECTRICAL MEASURING DEVICE

Warren J. Schmidt, Bloomfield, N. J., assignor to Westinghouse Electric Corporation, East Pittsburgh, Pa., a corporation of Pennsylvania Application June 23, 1955, Serial No. 517,595

17 Claims. (Cl. 317—167)

This invention relates to electrical measuring devices and has particular relation to multielement induction watthour meters for measuring the energy of polyphase circuits.

Watthour meters have previously been provided for measuring the energy of polyphase circuits which include a pair of electromagnetic elements positioned to influence suitable armature means. Each of the elements ordinarily include a magnetic structure having voltage and current magnetic poles with an air gap through which the armature means rotates. The voltage and current poles are provided with suitable winding means effective when energized to produce voltage and current magnetic fluxes cooperating to establish a shifting magnetic field in the air gap. These magnetic fields are effective to establish torques which are applied to the associated armature means.

In such watthour meters it is desirable that when the electromagnetic elements are similarly energized they apply similar torques to the associated armature means. By reason of variations in materials and dimensions inherent in the manufacturing processes involved, the electromagnetic elements are seldom of identical construction. Consequently, for similar energizations thereof the torques established thereby may differ in magnitude. For this reason it is customary to provide such meters with phase balance adjusting means positioned to operate on one or both of the elements to adjust the torques established by the associated element such that the torques are substantially equal for similar conditions of energization of the elements.

Such phase balance adjusting means have been constructed in a variety of forms. According to one well known construction, the adjusting means includes magnetic means for diverting magnetic flux from a magnetic structure away from the associated air gap to thereby control the strength of the magnetic field therein. Such a construction may be found in U. S. Patent No. 2,626,297.

According to the present invention, a multi-element watthour meter is provided which includes phase balance adjusting means operating upon an associated magnetic structure which is adjustable from a readily accessible area of the structure to effect the diversion of a portion of the voltage flux of the structure away from the associated air gap. In a preferred embodiment of the invention the phase balance adjusting means includes a shunt magnetic path positioned adjacent the air gap to divert a portion of the voltage flux away from the air gap. The shunt path includes adjustable magnetic means adjustable for diverting a variable portion of the voltage flux away from the air gap to thereby adjust the strength of the magnetic field. The magnetic means is spaced from the plane of the magnetic structure for adjustment relative thereto along an axis exending parallel to the plane of the structure and transverse to the axis of extension of the voltage pole. Such adjustment is conveniently effected by rotation of a control shaft about the desired axis from an area located beyond one end of the magnetic structure.

It has been observed that the operation of the phase balance adjusting means is also effective to modify the response of the meter independently of the modification effected by the phase balancing action. It is believed that such modification is the result of a distortion of magnetic flux of the magnetic structure caused by the magnetic means which results in the establishment of a torque which is applied to the associated armature means.

According to a further aspect of the invention, a meter is provided including phase balance adjusting means with means for compensating for the torque which is established by the associated magnetic means independently of the phase balancing action. Such compensating means may take the form of an electroconductive member proportioned and positioned to establish a compensating torque which is applied to the armature means to act in opposition to the torque established by the magnetic means. In order to provide compensation over the entire range of adjustment of the magnetic means, the electroconductive member is mounted for movement in response to adjustment of the phase balance adjusting means.

It has been further observed that operation of the phase balance adjusting means may result in substantial variation of the phase relationship between the voltage and current fluxes of the associated magnetic structure. Such variations in phase relationship are the result of variations in the portion of the voltage flux which is diverted from the associated air gap through the shunt path of the phase balance adjusting means.

According to a further aspect of the invention a meter is provided which includes phase balance adjusting means with means for compensating for variations in the phase relationship between voltage and current fluxes of the meter caused by operation of the phase balance adjusting means.

Such compensating means includes an electro-conductive lagging member proportioned and positioned relative to the magnetic structure to lag the portion of the voltage flux in the air gap as well as the portion of the voltage flux which is diverted from the air gap through the shunt path of the adjusting means. The compensating means further includes additional electro-conductive means proportioned and positioned with respect to the magnetic structure to compensate for variations in magnetic hysteresis and eddy current losses produced in the magnetic structure by the voltage flux. Such variations are caused by the diversion of a variable portion of the voltage flux through the shunt path of the adjusting means and contribute to variations in the phase relationship between the voltage and current fluxes.

The invention further provides a meter wherein the lagging member employed to compensate for variations in the phase relationship between the voltage and current fluxes is also utilized to compensate for the torque which is established by the magnetic means of the phase balancer independently of the balancing action. For this purpose the lagging member is positioned so as to establish a compensating torque which varies in accordance with adjustment of the magnetic means. The lagging member is further positioned so that the compensating torque substantially compensates for light load errors of the meter.

It is therefore an object of the invention to provide a multielement watthour meter including improved phase balance adjusting means.

It is a further object of the invention to provide a multielement watthour meter including phase balance adjusting means of simple and inexpensive construction which is adjustable from a readily accessible area of the meter.

It is another object of the invention to provide a multi-element watthour meter with phase balance adjusting means including magnetic means adjustable relative to an associated magnetic structure along an axis extending parallel to the plane of the structure and transverse to the axis of extension of the voltage pole of the structure.

It is still another object of the invention to provide a multielement watthour meter including phase balance adjusting means effective to establish a torque which is applied to the associated armature means independently of the phase balancing action with means for compensating for such torque.

It is a still further object of the invention to provide a multielement watthour meter including phase balance adjusting means with means for compensating for the effect of such adjusting means upon the phase relationship between magnetic fluxes of the associated magnetic structure.

It is still another object of the invention to provide a multielement watthour meter including phase balance adjusting means with an electroconductive member arranged to compensate for both the torque established by the phase balancer independently of the balancing action and for variations in the phase relationship between the voltage and current fluxes caused by the adjusting means.

Other objects of the invention will be apparent from the following description taken in conjunction with the accompanying drawings, in which.

Figure 1:
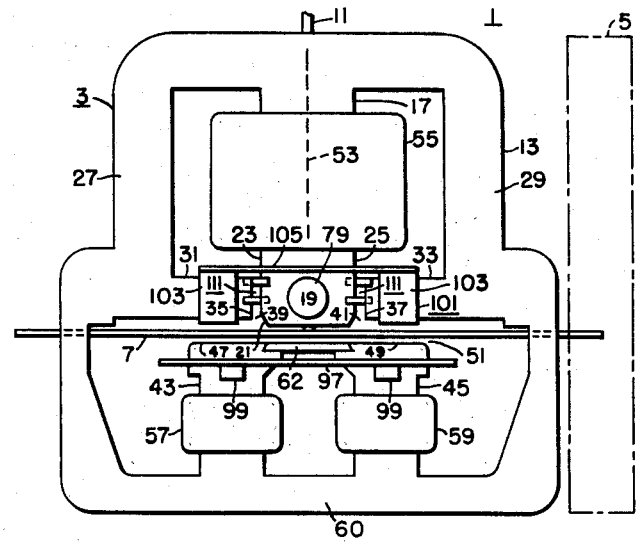
Figure 1 is a view with parts shown diagrammatically of a multielement watthour meter embodying the invention.

Referring to the drawings there is shown in Fig. 1 a watthour meter represented generally by the numeral 1 embodying the teachings of the invention. The meter 1 includes a pair of electromagnetic elements 3 and 5 of similar construction positioned to influence suitable electroconductive armature means. The armature means is shown in the form of a single electroconductive disc 7 secured to a shaft 11 for rotation about an axis under the common influence of the elements 3 and 5. It is understood that the armature means may assume other forms such as a pair of electroconductive discs secured to a common shaft for rotation as a unit about an axis with each disc under the influence of a separate one of the electromagnetic elements.

For certain purposes it may be desirable to mount the elements 3 and 5 in a pair of spaced parallel planes to influence the disc 7. In Fig. 1 the element 3 is shown rotated 90° counterclockwise about the axis of the shaft 11 from the normal position thereof which is in a plane extending transverse to the plane of the paper parallel to the plane of the element 5. The element 5 is illustrated in diagrammatic form in the normal position thereof in a plane extending transverse to the plane of the paper. Such arrangement of the electromagnetic elements of a multielement meter may be found in application Serial No. 517,409, filed June 23, 1955 by B. E. Lenehan and assigned to the assignee of the present invention.

Inasmuch as the elements 3 and 5 are of similar construction, it is only necessary to describe one of the elements.

As shown in Fig. 1, the element 3 includes a magnetic structure 13 preferably formed of a plurality of laminations 15 each having the configuration illustrated in Fig. 1. The laminations 15 may be constructed of any suitable material. Preferably the laminations are formed of a low loss magnetic material such as silicon steel. The structure 13 includes a voltage magnetic pole 17 having a pole face 19 and a front surface 21 extending transverse to the face 19. The pole 17 further includes a pair of opposed side surfaces 23 and 25. The structure 13 also includes a pair of spaced side arms 27 and 29 connected in parallel magnetic circuit relation with respect to the pole 17. The side arms 27 and 29 have respectively magnetic extensions 31 and 33 which project toward the voltage pole 17 along a common axis. The extensions 31 and 33 have respectively end faces 35 and 37 which are spaced from the side surfaces 23 and 25 of the pole 17 to define a pair of air gaps 39 and 41.

The magnetic structure 13 includes a pair of spaced current magnetic poles 43 and 45 having respectively pole faces 47 and 49. The pole faces 47 and 49 are located in a common plane which is parallel to and spaced from the plane of the pole face 19 to define an air gap 51. It is observed that the structure 13 is of symmetrical configuration having an axis of symmetry represented by the dotted line 53 which coincides with the axis of extension of the voltage pole 17.

To permit energization of the element 3, a voltage winding 55 is positioned to surround the pole 17 and a pair of current windings 57 and 59 are positioned to surround respectively the current poles 47 and 49. The winding 55 is adapted for enerergization in accordance with voltage of an electrical circuit (not shown) whereas the windings 57 and 59 are adapted for energization in accordance with current of the circuit (not shown). When the winding 55 is energized magnetic flux produced thereby follows a plurality of paths. A portion of the voltage flux will flow through a path which extends from the pole 17 through the air gap 51, the disc 7 and though the current poles 43 and 45 in parallel back to the pole 17 through the side arms 27 and 29 of the structure 13. Another portion of the voltage flux will flow through a path which extends from the pole 17 in parallel through the air gaps 39 and 41, the extensions 31 and 33 and back to the pole 17 through the side arms 27 and 29.

The windings 57 and 59 are connected for series energization to produce magnetic fluxes having opposing instantaneous directions of flow in the poles 43 and 45. When the windings 57 and 59 are energized magnetic flux produced thereby will follow a path extending from the pole 43 through the air gap 51, the disc 7, the pole face 19 back through the disc 7, the pole 45 and back to the pole 43 through a portion 60 of the structure 13. The voltage and current fluxes cooperate to establish a shifting magnetic field in the air gap 51 effective to apply a torque to the disc 7. A suitable magnetic shunt 62 is positioned between the poles 43 and 45 to provide overload compensation as is understood in the art.

As previously explained, it is desirable that when the elements 3 and 5 are similarly energized they produce substantially equal torques for application to the disc 7. For this purpose phase balance adjusting means may be provided to operate on one or both of the elements 3 and 5 to adjust the torques established thereby. According to the present invention, phase balance adjusting means is provided for the meter 1 which is adjustable from a readily accessible area of the meter 1 to effect the diversion of a portion of the voltage flux from the air gap of the associated structure. The adjusting means includes a shunt magnetic path positioned to divert a portion of the voltage flux from the air gap. Adjustable magnetic means is included in the shunt path for adjustment from an area located beyond one end of the magnetic structure to effect the diversion of a variable portion of the voltage flux through the shunt path for adjusting the strength of the magnetic field in the air gap.

Figure 2:
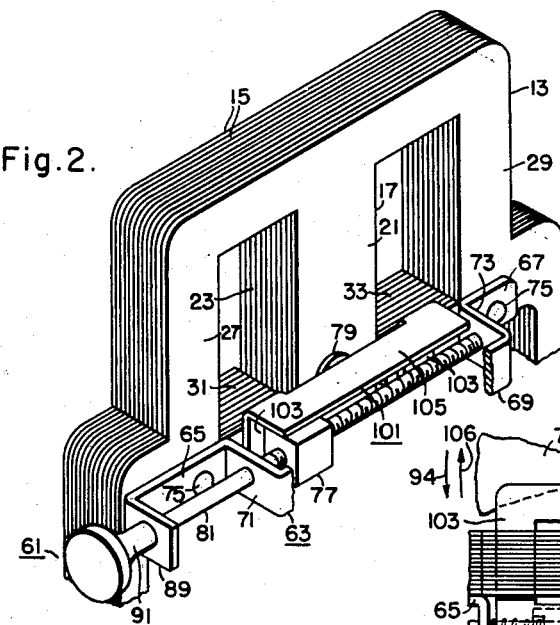
Fig. 2 is a view in perspective with parts removed of a portion of a magnetic structure of the meter of Fig. 1.

As illustrated in Fig. 2 phase balance adjusting means 61 is associated with the element 3 to control the torque applied by the element 3 to the disc 7. In order to divert a portion of the voltage flux of the structure 13 from the air gap 51, the adjusting means 61 includes a shunt magnetic path which is located adjacent the air gap 51 on the side of the air gap containing the voltage pole 17 to shunt a portion of the voltage flux from the side arms 27 and 29, the extensions 31 and 33, the air gaps 39 and 41 and the voltage pole 17. For this purpose a magnetic bracket 63 is provided which includes spaced portions 65 and 67 located in a common plane as viewed in Fig. 3 for engagement with spaced portions of the structure 13. The bracket 63 further includes a portion 69 defining a plane which is spaced from and parallel to the plane including the portions 65 and 67. The spaced portions 65 and 67 are connected to the portions 69 by transverse connecting portions 71 and 73 respectively.

To provide the shunt path the bracket 63 is positioned relative to the structure 13 with the portions 65 and 67 in engagement respectively with the side arms 27 and 29 of the structure 13 to have the portion 69 spaced from the structure 13. The bracket 63 may be secured to the structure 13 in any suitable manner such as by rivets 75 which extend through the spaced portions 65 and 67 of the bracket and the structure 13. The bracket 63 may be formed of any suitable magnetic material such as cold rolled steel. With this arrangement a portion of the voltage flux of the structure 13 is diverted from the structure 13 through the bracket 63 away from the air gap 51.

In order to permit diversion of an adjustable portion of the voltage flux away from the air gap to thereby permit adjustment of the torque established by the element 3, the shunt path including the bracket 63 further includes an adjustable portion which is adjustable to vary the magnetic reluctance of the shunt path to thereby adjust the amount of magnetic flux traversing the shunt path. For this purpose a magnetic member 77 is mounted at the side of the structure 13 containing the bracket 63 for adjustment relative to the structure 13. The member 77 may be formed of any suitable magnetic material such as cold rolled steel. The shunt path further includes a magnetic pole piece 79 formed of any suitable magnetic material which is secured to the surface 21 of the pole 17 in spaced relation with respect to the member 77. Consequently, by adjusting the member 77 to vary the space between the member 77 and the pole piece 79 the magnetic reluctance of the shunt path may be varied to thereby adjust the portion of the flux traversing the shunt path.

According to the invention the adjusting means 61 includes actuable means actuable from an area located beyond one end of the structure 13 to effect adjustment of the member 77 relative to the pole piece 79. For this purpose a control shaft 81 is provided including a threaded portion proportioned for engagement with a threaded cavity of the magnetic member 77. The shaft 81 is mounted for rotation about an axis extending parallel to the plane of the structure 13 and transverse to the axis of symmetry 53 to effect movement of the member 77 along such axis of rotation. Any suitable means may be employed to support the shaft 81 for rotation in this manner. Conveniently the magnetic bracket 63 is employed for this purpose.

Figure 3:
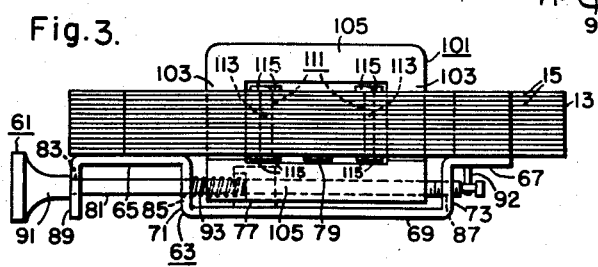
Fig. 3 is a view in top plan of the magnetic structure of Fig. 2.

To this end the bracket 63 is provided with a plurality of spaced bearing means in the form of aligned openings 83, 85 and 87 formed respectively in a transverse terminal portion 89 of the bracket 63, and the transverse portions 71 and 73 of the bracket as shown in Fig. 3. These openings are positioned to receive the shaft 81 to permit rotation of the shaft about an axis extending parallel to the plane of the structure 13 and transverse to the axis of symmetry 53. The shaft 81 is provided with an enlarged end portion 91 positioned beyond the adjacent end of the structure 13 for manipulation to effect rotation of the shaft. The end portion 91 engages the transverse portion 89 of the bracket 63 to prevent substantial axial movement of the shaft in the direction to the right in Fig. 3. A suitable spring 92 is secured to the portion 67 of the bracket for biased engagement with a portion of the shaft 81 of reduced diameter to assist in preventing axial movement of the shaft in the direction to the left in Fig. 3. A coil spring 93 is positioned to surround the shaft 81 in biased engagement with the portion 71 of the bracket and the member 77. This construction further assists in preventing movement of the shaft to the left in Fig. 3 and also assures positive adjustment of the member 77.

In order to prevent rotation of the member 77 with the shaft 81 and to provide an effective shunt magnetic path, the member 77 is positioned in engagement with the portion 69 of the bracket. With such arrangement rotation of the shaft 81 will effect movement of the member 77 axially of the shaft relative to the structure 13.

The amount of magnetic flux which traverses the shunt path and consequently the magnitude of the torque which is applied to the disc 7 is determined by the position of the member 77 relative to the pole piece 79. A maximum amount of flux traverses the shunt path when the member 77 is directly opposite the pole piece 79. With such positioning the reluctance of the path is a minimum value with the result that a minimum torque is applied to the disc 7. If the member 77 is positioned as shown in Fig. 3, the reluctance of the path is increased from the reluctance thereof in the previous example so that a lesser amount of flux traverses the shunt path to increase the torque applied to the disc 7. Consequently, by effecting rotation of the shaft 81, the member 77 may be moved relative to the pole piece 79 to adjust the torque applied to the disc 7.

It has been observed that the adjusting means 61 is also effective to modify the response of the meter 1 independently of the modification caused by the phase balancing action previously described. It is believed that the magnetic member 77 operates to distort magnetic flux of the structure 13 resulting in the establishment of a torque which is applied to the disc 7.

Figure 5:
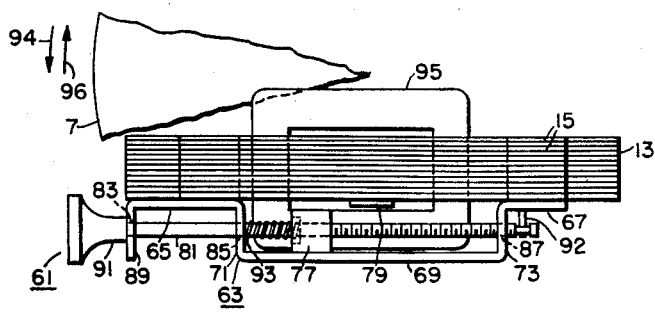
Fig. 5 is a view similar to Fig. 3 illustrating the embodiment of Fig. 4.

It has been observed that with the magnetic member 77 positioned to the left of the pole piece 79 as viewed in Fig. 5 the torque established by the flux distorting action of the member 77 tends to rotate the disc 7 in a counterclockwise direction as indicated by the arrow 94 of Fig. 5. Furthermore, as the member 77 is moved from the position shown in Fig. 5 to the right toward the pole piece 79, the magnitude of this torque increases. Although the effect of this torque may be acceptable in certain installations, the performance of the meter 1 may be considerably improved if the effect of such torque is eliminated.

According to the invention, the adjusting means 61 is provided with means for compensating for torque which is established by the adjusting means independently of the phase balancing action. Such compensating means is proportioned and positioned to establish a compensating torque which acts on the disc 7 in opposition with respect to the torque established by the adjusting means and which is substantially equal to such torque.

Figure 4:
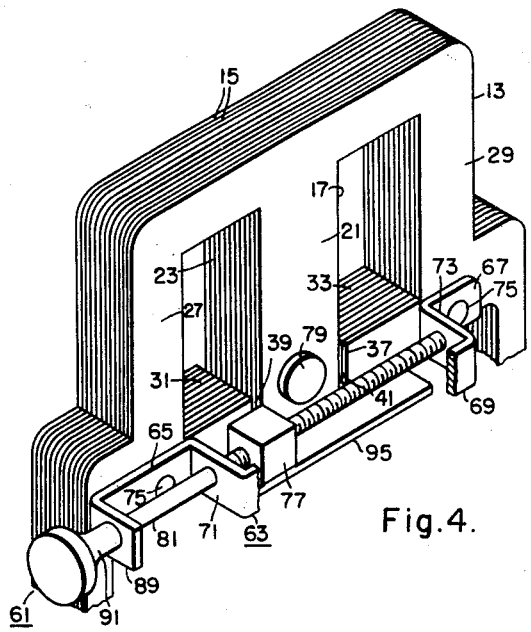
Fig. 4 is a view similar to Fig. 2 illustrating a different embodiment of the invention.

In order to compensate for such torque an electroconductive member is positioned to lag magnetic flux of the structure 13 for establishing a compensating torque which is applied to the disc 7. According to a preferred embodiment of the invention, the electroconductive member is positioned to lag the voltage flux of the structure 13. As illustrated in Figs. 4 and 5, an electroconductive member 95 in the form of a loop is positioned beneath the voltage pole 17 in the air gap 51 with the plane of the loop parallel to the pole face 19.

In order to provide compensation over the entire range of adjustment of the magnetic member 77, the member 95 is mounted for movement relative to the voltage pole 17 in response to adjustment of the magnetic member 77. For this purpose the member 95 is conveniently carried by the member 77 for movement therewith along an axis extending parallel to the axis of movement of the member 77. With such arrangement the member 95 intercepts a variable portion of the voltage flux to establish a variable compensating torque which is applied to the disc 7.

It has been observed that effective compensation is provided by positioning the members 77 and 95 relative to each other as shown in Fig. 5. As there shown, the member 77 is located substantially midway between the portion 71 of the bracket 63 and the pole piece 79 with the member 95 positioned slightly to the left of the pole piece 79. It has further been observed that movement of the member 77 from such position toward the pole piece 79 is accompanied by an effective increase in torque applied in the clockwise direction by the member 95 as indicated by the arrow 96 in Fig. 5.

In order to establish a desired phase relationship between the voltage and current fluxes of the structure 13, suitable lag adjusting means may be provided to lag one or both of the fluxes. As illustrated in Fig. 1, a lag member 97 is provided in the form of an electroconductive member secured to the current poles 43 and 45 in the path of the voltage flux to lag the voltage flux for establishing the desired phase relationship. The member 97 may be of any suitable construction and is preferably in the form of a loop positioned to surround the current poles 43 and 45. The member 97 may be secured to the poles 43 and 45 in any suitable manner such as by suitable rivets (not shown) which extend through struck-down tabs 99 of the member 97 and the associated current poles.

It has been observed that operation of the adjusting means 61 may result in a substantial variation in the phase relationship between the voltage and current fluxes. It is believed that such variation in the phase relationship is the result of the diversion of a variable portion of the voltage flux away from the lag member 97 through the shunt path provided by the bracket 63. It is further though that the diversion of a variable portion of the voltage flux through the shunt path operates to alter the magnetic hysteresis and eddy current losses produced in the structure 13 by action of the voltage flux to also contribute to such variations in the phase relationship.

According to the invention means are provided for compensating for the effect of the adjusting means 61 upon the phase relationship between the voltage and current fluxes. For this purpose auxiliary lag adjusting means 101 is provided which is effective to intercept the portion of the voltage flux in the air gap 51 as well as the portion of the voltage flux which is diverted from the structure 13 through the shunt magnetic path of the adjusting means 61. As illustrated in the drawings, the auxiliary lag adjusting means 101 comprises and electroconductive member having the configuration illustrated in Figs. 1, 2 and 3. As there shown, the member 101 is in the form of a loop having opposing first sides 103 and opposing second sides 105. It is observed that the sides 103 each includes a pair of transverse portions to provide a pair of loop portions which lie in a pair of transverse planes.

In order to assist in compensating for variations in phase displacement between the voltage and current fluxes, the auxiliary member 101 is positioned relative to the structure 13 such that one of the loop portions intercepts the portion of the voltage flux in the air gap 51 and the other of the loop portions intercepts the portion of the voltage flux which is diverted from the structure 13 through the shunt path of the adjusting means 61. For this purpose the member 101 is positioned symmetrically relative to the axis 53 with the one loop portion in the air gap 51 directly beneath the voltage pole 17 in a plane parallel to the plane of the pole face 19 to have the other transverse loop portion between the pole piece 79 and the member 77 in a plane parallel to the plane of the structure 13. The member 101 may be secured to the structure 13 in any suitable manner. If desired, the member 101 may be proportioned so that the lag member 97 may be omitted.

It will be recalled that the electroconductive member 95 is provided for the purpose of compensating for torque established by the adjusting means 61 independently of the phase balancing action. It has been observed that the lag member 101 may also be employed for this purpose. When the member 101 is so employed the member 95 may be omitted.

According to the invention the member 101 is positioned asymmetrically relative to the axis 53 in the path of the voltage flux to establish a compensating torque acting between the structure 13 and the disc 7 in opposition to the torque produced by the magnetic member 77. For this purpose the member 101 is shifted to the left as viewed in Fig. 1 from the position wherein the member 101 is symmetrical relative to the axis 53 to a position shown in Fig. 6 wherein the member 101 is asymmetrically located relative to the axis 53. With such arrangement the member 101 still links the portion of the voltage flux in the air gap 51 as well as the portion of the voltage flux which is diverted from the gap 51 through the bracket 63 in the manner of Fig. 1.

Figure 6:
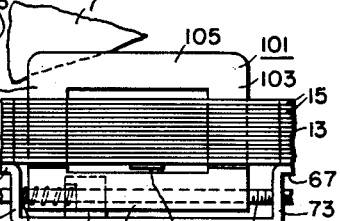
Fig. 6 is a view similar to Fig. 3 illustrating a further embodiment of the invention.

As explained in connection with Fig. 5 the torque established by the member 77 tends to rotate the disc 7 in a counterclockwise direction as indicated by the arrow 94 in Fig. 6 when the member 77 is positioned to the left of the pole piece 79 as shown in Fig. 6. As the member 77 is moved from such position to the right toward the pole piece 79 the magnitude of such torque is increased. With the member 101 positioned as shown in Fig. 6 it produces a torque which tends to rotate the disc 7 in a clockwise direction as indicated by the arrow 106 in Fig. 6. Inasmuch as an increasing portion of the voltage flux is diverted from the gap 51 through the member 101 in response to movement of the member 77 to the right in Fig. 6, the torque produced by the member 101 is correspondingly increased to provide compensation over the entire range of adjustment of the member 77.

The member 101 may further be employed to provide compensation for errors in registration of the meter 1 for light load conditions of an associated circuit (not shown). To this end the members 77 and 101 may be positioned relative to each other so that the compensating torque produced by the member 101 tends to rotate the disc 7 in the direction in which the disc normally rotates. Since a certain portion of the voltage flux is continuously linked by the member 101, the compensating torque includes a constant portion which supplies compensation for the light load error.

For rotation of the disc in a clockwise direction as viewed in Fig. 6 the member would be positioned as shown in Fig. 6 to produce a torque tending to rotate the disc in the clockwise direction for providing light load compensation. However, if rotation of the disc is in a counterclockwise direction as viewed in Fig. 6 the member 77 would be positioned to the right of the pole piece 79 in Fig. 6 for adjustment between the pole piece 79 and the portion 73 of the bracket with the member 101 located to the right of the pole piece 79 asymmetrically thereto. This arrangement would provide compensation for the torque produced by the member 77 as well as for the light load error of the meter.

It will be recalled that variations of the phase relationship between the voltage and current flux of the structure 13 are also caused by variation of the magnetic losses of the structure 13 produced by operation of the adjusting means 61. According to the invention means are provided to maintain the magnetic losses produced in the structure 13 by the voltage flux substantially constant over the entire range of adjustment of the adjusting means 61. For this purpose suitable magnetic loss producing means independent of the structure 13 are positioned in the path of the voltage flux. The loss producing means are proportioned such that the magnetic losses of the structure 13 are maintained substantially constant over the range of adjustment of the adjusting means 61.

It has been observed that as the magnetic member 77 is adjusted to effect diversion of a greater portion of the voltage flux away from the air gap 51, the magnetic losses of the structure 13 produced by the voltage flux are substantially increased resulting in a substantial variation of the phase relationship between the voltage and current fluxes. It is believed that this action results from the diversion of a portion of the voltage flux from a low loss magnetic path provided by the structure 13 to a relatively high loss magnetic path provided by the bracket 63 and the magnetic member 77.

In order to compensate for such variations in magnetic losses of the structure 13, the invention provides that suitable loss producing means be introduced into the structure 13 such that as an increasing portion of the voltage flux is diverted through the shunt path, the magnetic losses of the loss producing means are correspondingly reduced. For this purpose a pair of wedges 111 are positioned in the air gaps 39 and 41 of the structure 13 which are preferably formed of an electro-conductive material such as copper. When a portion of the voltage flux traverses the wedges 111, eddy currents are created in the wedges which establish losses constituting a portion of the magnetic losses of the structure 13. Since the eddy currents developed in the wedges 111 are proportional to the magnitude of the flux traversing the wedges, the magnetic losses contributed by the wedges 111 are decreased as the flux therethrough is decreased as a result of increased diversion of the voltage flux from the pole 17 through the bracket 63. The wedges 111 are proportioned such that the magnetic losses of the structure 13 remain substantially constant throughout the range of adjustment of the member 77.

The wedges 111 may be of any suitable construction. Conveniently, the wedges are of the construction described in application Serial No. 465,568, filed October 29, 1954 by Karl Palmer and assigned to the assignee of the present invention. According to such construction each of the wedges includes a central spacer portion 113 and a plurality of integral spaced clamping projections 115 as best shown in Fig. 3. The wedges are positioned in the air gaps 39 and 41 with the spacer portions 113 in engagement with the associated end faces 35 and 37 of the magnetic extensions 31 and 33 and with the side surfaces 23 and 25 of the pole 17. The projections 115 of the wedges 111 are positioned to engage front and rear laminations of the structure 13. Such construction of the wedges 111 provides effective spacing of the magnetic extensions 31 and 33 with respect to the pole 17 and also effects clamping of portions of the laminations 15 which form the pole 17 and the extensions 31 and 33.

Since certain changes may be made in the above apparatus and different embodiments of the invention may be made without departing from the scope thereof, it is intended that all matter contained in the above description or shown in the accompanying drawings shall be interpreted as illustrative and not in a limiting sense.

I claim as my invention:

1. In an electrical meter, a magnetic structure having an air gap, said magnetic structure including a voltage magnetic pole and a pair of current magnetic poles, said voltage pole extending along a first axis, winding means surrounding the voltage and current poles effective when energized for producing voltage and current magnetic fluxes cooperating to establish a shifting magnetic field in the air gap, an electroconductive armature mounted for rotation relative to the magnetic structure about a second axis through the air gap under the influence of the magnetic field, and magnetic diverting means for diverting a portion of the voltage flux away from the air gap and away from the armature to control the effective strength of the magnetic field, said diverting means including a shunt magnetic path positioned to divert a portion of the voltage flux away from the air gap and away from the armature, and adjustable magnetic means included in said path spaced from the magnetic structure for movement relative to the voltage pole along a third axis extending parallel to the plane of the magnetic structure and transverse to said first axis for varying the reluctance of the shunt path.

2. In an electrical meter, a magnetic structure having an air gap, said magnetic structure including a voltage magnetic pole and a pair of current magnetic poles, said voltage pole extending along a first axis, winding means surrounding the voltage and current poles effective when energized for producing voltage and current magnetic fluxes cooperating to establish a shifting magnetic field in the air gap, an electroconductive armature mounted for rotation relative to the magnetic structure about a second axis through the air gap under the influence of the magnetic field, and magnetic diverting means for diverting a portion of the voltage flux away from the air gap and away from the armature to control the effective strength of the magnetic field, said diverting means including a shunt magnetic path positioned to divert a portion of the voltage flux away from the air gap and away from the armature, a magnetic member included in said path spaced from the plane of the magnetic structure, and actuable means for effecting adjustment of the magnetic member relative to the voltage pole along a third axis extending parallel to the plane of the magnetic structure and transverse to said first axis for varying the reluctance of the shunt path, said actuable means being actuable from an area located beyond one end of the magnetic structure.

3. In an electrical meter, a magnetic structure including an air gap, winding means for the magnetic structure effective when energized for directing a plurality of alternating magnetic fluxes into the air gap, said magnetic fluxes having a predetermined phase relationship to establish a shifting magnetic field in the air gap, armature means mounted for rotation relative to the magnetic structure about an axis through the air gap under the influence of the magnetic field, magnetic diversion means for diverting a portion of one of said magnetic fluxes away from the air gap and away from the armature to control the effective strength of the shifting field, said diversion means including adjustable magnetic means adjustable relative to the structure to effect diversion of a variable portion of said one of said fluxes to adjust the strength of the magnetic field, said adjustable means also operating to vary the phase relationship between said fluxes, and electroconductive lagging means positioned to intercept the portion of said one of said magnetic fluxes in the air gap and said diverted flux portion for neutralizing the effect of the adjustable means upon said phase relationship.

4. In an electrical device, a magnetic structure including a plurality of magnetic poles, winding means for the magnetic poles effective when energized for directing a plurality of magnetic fluxes to an area, said fluxes having a predetermined phase relationship to establish a shifting magnetic field in the area, one of said magnetic fluxes following a first path traversing said area, means mounted for movement through the area relative to the magnetic structure under the influence of the magnetic field, magnetic diversion means including a second path spaced from said area to divert a portion of one of said magnetic fluxes away from the area and away from the movable means, and adjustable means included in the second path adjustable relative to the structure for diverting a variable portion of said one of said magnetic fluxes from said first path to said second path away from said area and away from the movable means to adjust the effective strength of the magnetic field; said adjustable means also operating to vary the phase relationship between the magnetic fluxes, and an electroconductive lag loop positioned in said first and second paths to intercept the portion of said one of said magnetic fluxes traversing said area and said diverted flux portion in the second path for neutralizing the effect of the adjustable means upon said phase relationship.

5. In an electrical meter, a magnetic structure including a voltage magnetic pole having a voltage pole face and a pair of spaced current magnetic poles having current pole faces, said voltage pole extending along a first axis, said current pole faces lying substantially in a common plane which is spaced from and parallel to the plane of the voltage pole face to define an air gap, a voltage winding surrounding the voltage pole effective when energized for directing a voltage magnetic flux into the air gap, current windings surrounding the current poles effective when energized for directing a current magnetic flux into the air gap, said voltage and current fluxes having a predetermined phase relationship to establish a shifting magnetic field in the air gap, an electroconductive armature mounted for rotation relative to the magnetic structure about a second axis through the air gap under the influence of the magnetic field, magnetic diversion means including a shunt magnetic path positioned to divert a portion of the voltage flux away from the air gap and away from the armature, and a magnetic member adjustable for diverting a variable portion of the voltage flux away from the air gap and away from the armature to adjust the effective strength of the magnetic field, said magnetic member being spaced from the magnetic structure for adjustment relative to the structure along a third axis extending transverse to said first axis and parallel to the plane of the structure for varying the reluctance of the shunt path, said magnetic member also operating to vary the phase relationship between the voltage and current fluxes, and an electroconductive loop including first and second transverse loop portions, said loop being positioned relative to the magnetic structure with said first loop portion beneath the voltage pole in a plane parallel to said common plane to intercept the portion of said voltage flux in the air gap, and with said second loop portion between the magnetic structure and the magnetic member in a plane parallel to the plane of the structure to intercept said diverted voltage flux portion for neutralizing the effect of the magnetic member upon said phase relationship.

6. In an electrical meter, a magnetic structure having voltage and current magnetic poles and an air gap, winding means surrounding the voltage and current poles effective when energized to produce voltage and current magnetic fluxes having a predetermined phase relationship, said voltage and current fluxes cooperating to establish a shifting magnetic field in the air gap, said voltage flux following a first path in the magnetic structure to produce magnetic hysteresis and eddy current losses in the magnetic structure, an electroconductive armature mounted for rotation about an axis relative to the magnetic structure through the air gap under the influence of the shifting field, magnetic diverting means including a second path positioned to divert a portion of the voltage flux from said first path away from said air gap, and adjustable means included in the second path; said adjustable means being adjustable relative to the magnetic structure to effect diversion of a variable portion of the voltage flux from said first path through the second path away from the air gap to adjust the effective strength of the shifting field, said adjustable means also operating to vary the magnetic losses produced by said voltage flux to thereby vary the phase relationship between said voltage and current fluxes, and compensating means for substantially compensating for the effect of said adjustable means upon said phase relationship, said compensating means comprising magnetic loss producing means independent of the magnetic structure positioned in said first path, said loss producing means being proportioned such that magnetic losses produced by said voltage flux are maintained substantially constant over the range of adjustment of said adjustable means.

7. In an electrical meter, a magnetic structure having a voltage magnetic pole with a voltage pole face and a pair of opposed voltage pole side surfaces, said structure including a pair of magnetic extensions in parallel magnetic circuit relation with respect to said voltage pole, each of said extensions having an end surface spaced from a separate one of said side surfaces to define a pair of first air gaps, said structure further having a pair of spaced current magnetic poles with current pole faces located in a common plane which is spaced from and parallel to the plane of the voltage pole face to define a second air gap, voltage winding means surrounding said voltage pole effective when energized to direct voltage flux through said first air gaps in parallel, and through the second air gap, current winding means surrounding the current poles effective when energized to direct current flux through the second air gap, said voltage and current fluxes having a predetermined phase relationship to establish a shifting magnetic field in the second air gap, said voltage flux being effective to produce magnetic hysteresis and eddy current losses in the magnetic structure, an electroconductive armature mounted for rotation relative to the magnetic structure about an axis through the second air gap under the influence of the shifting field, magnetic diverting means including a shunt path positioned to divert a portion of said voltage flux from said first air gaps and said voltage pole away from said second air gap, and adjustable means adjustable relative to said structure to effect diversion of a variable portion of said voltage flux through the shunt path to adjust the effective strength of the shifting field; said adjustable means also operating to vary the magnetic losses produced by voltage flux to thereby vary the phase relationship between the voltage and current fluxes, and compensating means for substantially compensating for the effect of said adjustable means upon said phase relationship, said compensating means comprising a pair of electroconductive members each positioned in a separate one of said first air gaps in the path of the voltage flux, said electroconductive members being proportioned such that magnetic losses produced by voltage flux are maintained substantially constant over the range of adjustment of said adjustable means.

8. In an electrical meter, a magnetic structure having a plurality of magnetic poles and an air gap, winding means surrounding the magnetic poles effective when energized to produce a plurality of magnetic fluxes having a predetermined phase relationship, said fluxes cooperating to establish a shifting magnetic field in the air gap, one of said fluxes following a first path in the magnetic structure to produce magnetic hysteresis and eddy current losses in the magnetic structure, an electroconductive armature mounted for movement relative to the magnetic structure through the air gap under the influence of the shifting field, magnetic diverting means including a second path positioned to divert a portion of said one of said fluxes from said first path away from the air gap, and adjustable means included in the second path; said adjustable means being adjustable relative to the magnetic structure to effect diversion of a variable portion of said one of said fluxes from said first path through the second path away from the air gap to adjust the effective strength of the shifting field, said adjustable means also operating to vary the magnetic losses produced by said one of said fluxes to thereby vary the phase relationship between said plurality of fluxes, and compensating means for substantially compensating for the effect of said adjustable means upon said phase relationship, said compensating means comprising magnetic loss producing means independent of the magnetic structure positioned in said first path, said loss producing means being proportioned such that magnetic losses produced by said one of said fluxes are maintained substantially constant over the range of adjustment of said adjustable means.

9. In an electrical meter, a magnetic structure having voltage and current magnetic poles spaced to define an air gap, winding means surrounding the voltage and current poles effective when energized to produce voltage and current magnetic fluxes cooperating to establish a shifting magnetic field in the air gap, said voltage flux following a first path in the magnetic structure to produce magnetic hysteresis and eddy current losses in the magnetic structure, flux lagging means positioned in said first path to lag said voltage flux to establish a predetermined phase relationship between the voltage and current fluxes, an electroconductive armature mounted for rotation about an axis relative to the magnetic structure through the air gap under the influence of the shifting field, magnetic diverting means including a second path positioned to divert a portion of the voltage flux from said first path away from said air gap, and adjustable means included in the second path; said adjustable means being adjustable relative to the magnetic structure to effect diversion of a variable portion of the voltage flux from said first path through the second path away from the air gap to adjust the effective strength of the shifting field, said adjustable means also operating to divert voltage flux away from said flux lagging means, and to vary the magnetic losses produced by said voltage flux to thereby vary the phase relationship between said voltage and current fluxes, and compensating means for substantially compensating for the effect of said adjustable means upon said phase relationship, said compensating means including auxiliary flux lagging means positioned in said first and second paths to lag voltage flux in said air gap and said diverted voltage flux portion, and magnetic loss producing means independent of the magnetic structure positioned in said first path, said loss producing means being proportioned such that magnetic losses produced by said voltage flux are maintained substantially constant over the range of adjustment of said adjustable means.

10. In an electrical meter, a magnetic structure having an air gap, said magnetic structure including a plurality of spaced magnetic poles, windig means surrounding the poles effective when energized for producing magnetic fluxes cooperating to establish a shifting magnetic field in the air gap, an electroconductive armature mounted for rotation relative to the magnetic structure about an axis through the air gap under the influence of the shifting field, magnetic diverting means for diverting a portion of one of said fluxes away from the air gap and away from the armature to control the effective strength of the shifting field, said diverting means including adjustable means adjustable relative to the structure to effect diversion of a variable portion of said one of said fluxes away from the air gap and away from the armature to adjust the strength of the shifting field, said adjustable means also operating to establish a first torque acting between the structure and the armature which adversely affects the response of the meter independently of the flux diverting action, and compensating means for substantially compensating for the effect of said adjustable means upon the response of the meter, said compensating means comprising an electroconductive member arranged so as to intercept a variable portion of said one of said fluxes in response to adjustment of the adjustable means for establishing a variable compensating force which is equal and opposite to the first force throughout the range of adjustment of the adjustable means.

11. In an electrical meter, a magnetic structure having an air gap, said magnetic structure including a voltage magnetic pole and a pair of spaced current magnetic poles, said voltage pole extending along a first axis, winding means surrounding the voltage and current poles effective when energized for producing voltage and current magnetic fluxes cooperating to establish a shifting magnetic field in the air gap, an electroconductive armature mounted for rotation relative to the magnetic structure about a second axis through the air gap under the influence of the shifting field, magnetic diverting means for diverting a portion of the voltage flux away from the air gap and away from the armature to control the effective strength of the shifting field, said diverting means including a shunt path positioned to divert a portion of the voltage flux away from said air gap and away from the armature, and adjustable means included in the shunt path; said adjustable means being adjustable relative to the magnetic structure along a third axis extending transverse to said first axis and parallel to the plane of the magnetic structure to effect diversion of a variable portion of the voltage flux away from the air gap and away from the armature to adjust the strength of the shifting field, said adjustable means also operating to establish a first torque acting between the magnetic structure and the armature which adversely affects the response of the meter, and compensating means for substantially compensating for the effect of said adjustable means upon the response of the meter, said compensating means comprising an electroconductive loop spaced from said shunt path in the path of the voltage flux, said loop being movable relative to the magnetic structure along a fourth axis extending parallel to said third axis in response to adjustment of said adjustable means to intercept a variable portion of the voltage flux, said loop being proportioned and positioned with respect to said adjustable means to establish a second torque which acts between the magnetic structure and the armature in opposition with respect to said first torque, and which is substantially equal to said first torque throughout the range of adjustment of the adjustable means.

12. In an electrical meter, a magnetic structure having an air gap, said magnetic structure including a plurality of magnetic poles, winding means for the magnetic poles effective when energized for producing a plurality of magnetic fluxes cooperating to establish a shifting magnetic field in the air gap, an electroconductive armature mounted for rotation relative to the magnetic structure about an axis through the air gap under the influence of the shifting field, and magnetic diverting means for diverting a portion of one of said fluxes away from the air gap and away from the armature to control the effective strength of the shifting field, said diverting means including adjustable magnetic means adjustable relative to the magnetic structure to effect diversion of a variable portion of said one of the fluxes to adjust the strength of the shifting field; said magnetic means operating also to establish a first torque acting between the magnetic structure and the armature which adversely affects the response of the meter, and compensating means for substantially compensating for the effect of said magnetic means upon the response of the meter, said compensating means comprising means movable relative to the magnetic structure in response to adjustment of the magnetic means, said last-named means being proportioned and positioned relative to the magnetic means to establish a second torque which acts between the magnetic structure and the armature to compensate for said first torque throughout the range of adjustment of the magnetic means.

13. In an electrical meter, a magnetic structure having an air gap, said magnetic structure including a voltage magnetic pole and a pair of spaced current magnetic poles, said voltage pole extending along a first axis, winding means surrounding the voltage and current poles effective when energized for producing voltage and current magnetic fluxes cooperating to establish a shifting magnetic field in the air gap, an electroconductive armature mounted for rotation relative to the magnetic structure about a second axis through the air gap under the influence of the shifting field, magnetic diverting means for diverting a portion of the voltage flux away from the air gap and away from the armature to control the effective strength of the shifting field, said diverting means including a shunt path positioned to divert a portion of the voltage flux away from said air gap, and away from the armature, and adjustable means included in the shunt path; said adjustable means being adjustable relative to the magnetic structure along a third axis extending transverse to said first axis and parallel to the plane of the magnetic structure to effect diversion of a variable portion of the voltage flux away from the air gap and away from the armature to adjust the strength of the shifting field, said adjustable means also operating to establish a first torque acting between the magnetic structure and the armature which adversely affects the response of the meter, and compensating means for substantially compensating for the effect of said adjustable means upon the response of the meter, said compensating means comprising an electroconductive loop positioned in fixed relation to the structure asymmetrically relative to said first axis in the path of said diverted flux portion to establish a compensating torque acting between the structure and the armature in opposition with respect to said first torque.

14. In an electrical meter, a magnetic structure including a voltage magnetic pole having a voltage pole face and a pair of spaced current magnetic poles having current pole faces, said current pole faces being located in a common plane spaced from the plane of the voltage pole face to define an air gap, winding means surrounding the voltage and current poles effective when energized to produce voltage and current magnetic fluxes cooperating to establish a shifting magnetic field in the air gap, an electroconductive armature mounted for rotation relative to the magnetic structure about an axis through the air gap under the influence of the magnetic field, a shunt magnetic path positioned to divert a portion of the voltage magnetic flux away from the air gap and away from the armature, said shunt path including a magnetic member spaced from the magnetic structure at a first side thereof, and a magnetic bracket engaging said magnetic structure at spaced points on said first side; said bracket including a portion spaced from the magnetic structure in engagement with said magnetic member, and actuable means carried by the bracket effective when actuated for adjusting the magnetic member relative to the voltage pole along an axis extending parallel to the plane of the magnetic structure and to said common plane to effect diversion of a variable portion of said voltage flux for adjusting the strength of the magnetic field.

15. In an electrical meter, a magnetic structure including an air gap, winding means for the magnetic structure effective when energized for directing a plurality of alternating magnetic fluxes into the air gap, said magnetic fluxes having a predetermined phase relationship to establish a shifting magnetic field in the air gap, armature means mounted for rotation relative to the magnetic structure about an axis through the air gap under the influence of the magnetic field, magnetic diversion means for diverting a portion of one of said magnetic fluxes away from the air gap and away from the armature to control the effective strength of the shifting field, said diversion means including adjustable means adjustable relative to the structure to effect diversion of a variable portion of said one of said fluxes to adjust the strength of the magnetic field, said adjustable means also operating to vary the phase relationship between said fluxes, and electroconductive lagging means positioned to intercept the portion of said one of said magnetic fluxes in the air gap and said diverted flux portion for neutralizing the effect of the adjustable means upon said phase relationship, said adjustable means further operating to establish a first torque acting between the structure and the armature means which tends to rotate the armature means in a first direction, said lagging means being positioned asymmetrically with respect to said one of said magnetic fluxes to establish a compensating force which tends to rotate the armature means in a second direction opposite to said first direction.

16. In an electrical meter, a magnetic structure having an air gap, said structure including a plurality of spaced magnetic poles, winding means for the magnetic poles effective when energized for producing a plurality of magnetic fluxes cooperating to establish a shifting magnetic field in the air gap, an electroconductive armature mounted for rotation relative to the structure about an axis through the air gap under the influence of the shifting field, magnetic diverting means for diverting a portion of the voltage flux away from the air gap and away from the armature to control the effective strength of the shifting field, said diverting means including adjustable means adjustable relative to the structure to effect diversion of a variable portion of one of the fluxes away from the air gap and away from the armature to adjust the strength of the shifting field, said adjustable means also operating to establish a first torque acting between the magnetic structure and the armature which tends to rotate the armature in a first direction, and compensating means for substantially compensating for said first force, said compensating means comprising an electroconductive loop positioned in fixed relation to said structure asymmetrically relative to said one of said fluxes in the path of said diverted flux portion to establish a compensating force acting between the structure and the armature in a second direction opposite to said first direction.

17. In an electrical meter, a magnetic structure including a voltage magnetic pole having a voltage pole face and a pair of spaced current magnetic poles having current pole faces, said voltage pole extending along a first axis, said current pole faces lying substantially in a common plane which is spaced from and parallel to the plane of the voltage pole face to define an air gap, a voltage winding surrounding the voltage pole effective when energized for directing a voltage magnetic flux into the air gap, current windings surrounding the current poles effective when energized for directing a current magnetic flux into the air gap, said voltage and current fluxes having a predetermined phase relationship to establish a shifting magnetic field in the air gap, an electroconductive armature mounted for rotation relative to the magnetic structure about a second axis through the air gap under the influence of the magnetic field, magnetic diversion means including a shunt magnetic path positioned to divert a portion of the voltage flux away from the air gap and away from the armature, and a magnetic member adjustable for diverting a variable portion of the voltage flux away from the air gap and away from the armature to adjust the effective strength of the magnetic field, said magnetic member being spaced from the magnetic structure for adjustment relative to the structure along a third axis extending transverse to said first axis and parallel to the plane of the structure for varying the reluctance of the shunt path, said magnetic member also operating to vary the phase relationship between the voltage and current fluxes, and an electroconductive loop including first and second transverse loop portions, said loop being positioned relative to the magnetic structure with said first loop portion beneath the voltage pole in a plane parallel to said common plane to intercept the portion of said voltage flux in the air gap, and with said second loop portion between the magnetic structure and the magnetic member in a plane parallel to the plane of the structure to intercept said diverted voltage flux portion for neutralizing the effect of the magnetic member upon said phase relationship, said magnetic member further operating to establish a first torque acting between the magnetic structure and the armature which adversely affects the response of the meter, said electroconductive loop being positioned asymmetrically relative to said first axis to establish a compensating torque acting between the structure and the armature in opposition into said first torque.

References Cited in the file of this patent

UNITED STATES PATENTS

| | | |
|---|---|---|
| 1,248,527 | Mylius | Dec. 4, 1917 |
| 1,677,336 | Goldsborough | July 17, 1928 |
| 2,057,443 | Mylius | Oct. 13, 1936 |
| 2,149,288 | Green | Mar. 7, 1939 |
| 2,329,123 | Leippe | Sept. 7, 1943 |
| 2,352,965 | Mendelsohn | July 4, 1944 |
| 2,365,588 | Petzinger | Dec. 19, 1944 |

FOREIGN PATENTS

| | | |
|---|---|---|
| 571,462 | Germany | Feb. 9, 1933 |